US011665300B2

(12) United States Patent
B et al.

(10) Patent No.: US 11,665,300 B2
(45) Date of Patent: May 30, 2023

(54) METHOD AND A SYSTEM FOR MANAGING STORAGE OF A SCANNED DOCUMENT

(71) Applicant: TOSHIBA TEC KABUSHIKI KAISHA, Tokyo (JP)

(72) Inventors: Pallavi H B, Karnataka (IN); Hariharasudhan Srinivasan, Karnataka (IN)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/694,226

(22) Filed: Mar. 14, 2022

(65) Prior Publication Data

US 2022/0385781 A1    Dec. 1, 2022

(30) Foreign Application Priority Data

May 28, 2021 (IN) .............................. 202141023820

(51) Int. Cl.
*H04N 1/04* (2006.01)
*H04N 1/32* (2006.01)
*H04N 1/00* (2006.01)

(52) U.S. Cl.
CPC ....... *H04N 1/0402* (2013.01); *H04N 1/00427* (2013.01); *H04N 1/32448* (2013.01); *H04N 2201/0094* (2013.01)

(58) Field of Classification Search
CPC ............. H04N 1/0402; H04N 1/00427; H04N 1/32448; H04N 2201/0094

USPC ......................................................... 358/1.15
See application file for complete search history.

(56) References Cited

U.S. PATENT DOCUMENTS

| 5,734,482 | A | 3/1998 | Miyamoto et al. |
| 6,476,933 | B1 | 11/2002 | Honma |
| 6,850,653 | B2 | 2/2005 | Abe |
| 8,023,136 | B2 * | 9/2011 | Dugas ................ H04N 1/00127 358/1.18 |
| 8,035,842 | B2 | 10/2011 | Kouchi et al. |
| 8,164,801 | B2 * | 4/2012 | Hoblit ................ H04N 1/32133 358/1.15 |
| 8,810,815 | B2 * | 8/2014 | Kishida .............. H04N 1/00973 358/1.15 |
| 2006/0072144 | A1 * | 4/2006 | Dowling ............... G06F 21/606 358/1.15 |

* cited by examiner

*Primary Examiner* — Allen H Nguyen
(74) *Attorney, Agent, or Firm* — Foley & Lardner LLP (57) ABSTRACT

A method and system for managing storage of scanned document in Multi-Function Printer (MFP). The method comprises receiving document and request for scanning the document. Further, the method comprises determining options for storing the document, based on properties for scanning the document and current capacity of storage unit. Each of the options indicates image file format for the document and at least one of color mode or image resolution for the document. Furthermore, the method comprises providing the options for receiving selection from user. Thereafter, the method comprises storing, the scanned version of the document in the storage unit, based on option selected by the user. The method and system ensures that the scanning of the document is performed even when the sufficient capacity is not available in the MFP.

33 Claims, 8 Drawing Sheets

METHOD AND A SYSTEM FOR MANAGING STORAGE OF A SCANNED DOCUMENT

TECHNICAL FIELD

The present disclosure generally relates to data storage. More particularly, the present disclosure relates to a method and a system for managing storage of a scanned document in a Multi-Function Printer (MFP).

BACKGROUND

An MFP is a device which incorporates functionality of multiple devices. The MFP provides centralized document management/distribution/production. The functionalities includes fax, photocopying, printing, scanning, and the like. One of the functionalities of the MFP is scanning a document of a user. A user may wish to store a scanned version of the document with properties provided by the user. The properties comprise a file format, an image resolution, a color mode, and the like. The MFP stores the scanned version of the document with the properties provided by the user. However, in some cases, a storage unit associated with the MFP may not have sufficient memory capacity to store the document with the properties provided by the user.

Figure 1:
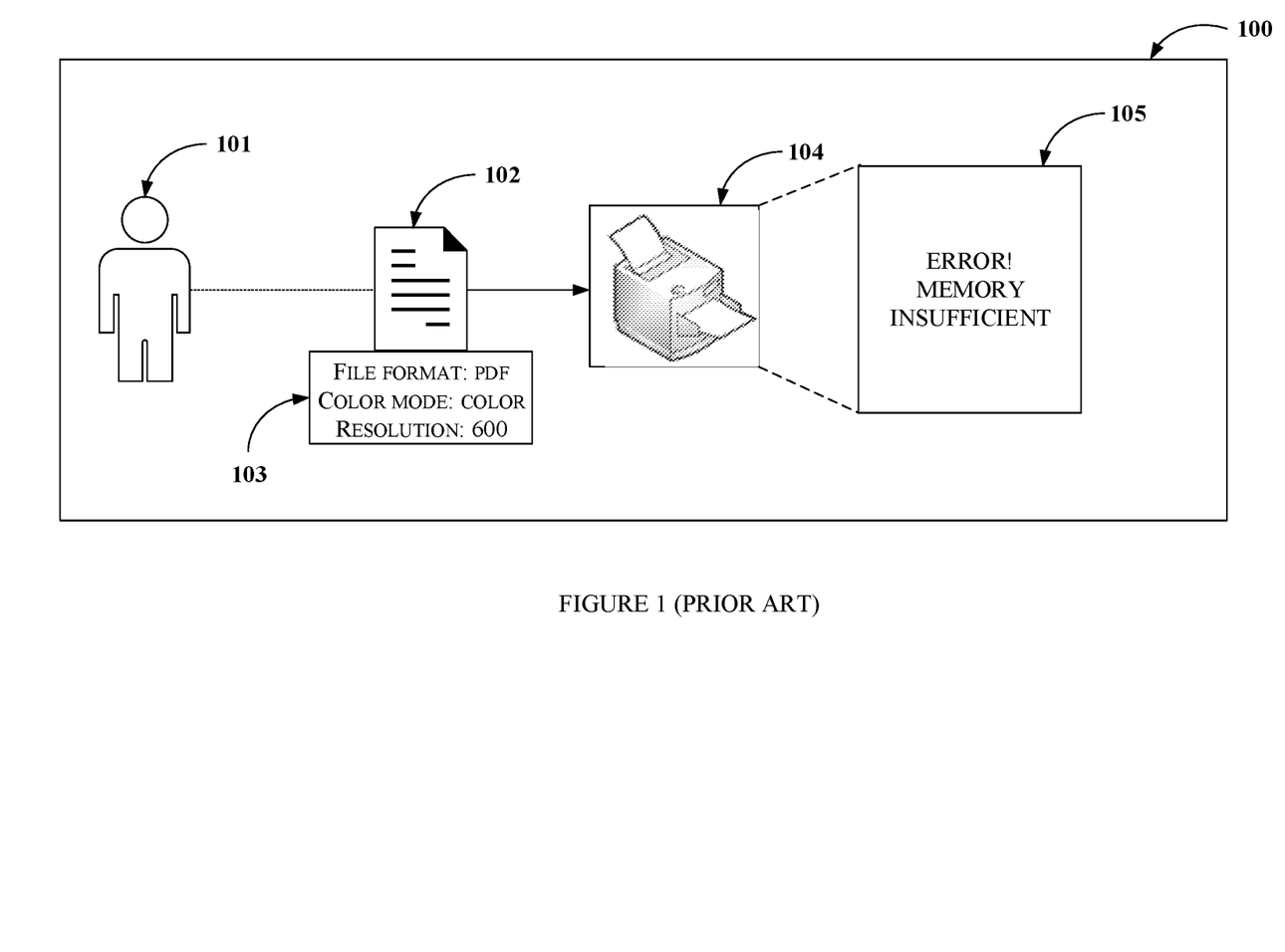
FIG. 1 shows an environment implementing a conventional system for scanning a document of a user in an MFP.

FIG. 1 shows an environment 100 implementing a conventional system for scanning a document 102 of a user 101 in an MFP 104. The user 101 provides the document 102 to the MFP 104 along with a request 103 for scanning the document 102. The request 103 comprises the properties for scanning the document 102. For example, the properties may be the file format for storing the document 102 as Portable Document Format (PDF) format, the color mode as color, or the image resolution as 600 Dots Per Inch (dpi). The MFP 104 determines that the memory capacity of the storage unit is less than a capacity required to store the document 102 with the properties. The MFP 104 displays an error message on display 105 associated with the MFP 104. The error message may indicate that sufficient memory is not available to store the document 102 with the properties. For example, the error message may be "Error! Memory insufficient." Further, the MFP 104 cancels the scanning of the document 102. Hence, the MFP 104 of the conventional system is not able to serve the request 103 of the user 101 when the memory capacity of the storage unit is insufficient. This reduces user convenience. There is a need of an efficient system to overcome the above-stated limitation.

The information disclosed in this background of the disclosure section is only for enhancement of understanding of the general background of the invention and should not be taken as an acknowledgement or any form of suggestion that this information forms the prior art already known to a person skilled in the art.

SUMMARY

In at least one embodiment, the present disclosure discloses a method for managing storage of a scanned document in an MFP. The method comprises receiving a document and a request for scanning the document, using the MFP. Further, the method comprises determining one or more options for storing the document. The one or more options are determined based on one or more properties for scanning the document and a current capacity of a storage unit associated with the MFP. Each of the one or more options indicates an image file format for the document and optionally at least one of, a color mode or an image resolution for the document. Furthermore, the method comprises providing the one or more options for receiving a selection from a user. Thereafter, the method comprises storing the scanned version of the document in the storage unit, based on an option selected by the user from the one or more options.

In at least one embodiment, the present disclosure discloses a system for managing storage of a scanned document in an MFP. The system comprises one or more processors and a memory. The one or more processors are configured to receive a document and a request for scanning the document, using the MFP. Further, the one or more processors are configured to determine one or more options for storing the document. The one or more options are determined based on one or more properties for scanning the document and a current capacity of a storage unit associated with the MFP. Each of the one or more options indicates an image file format for the document and optionally at least one of a color mode or an image resolution for the document. Furthermore, the one or more processors are configured to provide the one or more options for receiving a selection from a user. Thereafter, the one or more processors are configured to store the scanned version of the document in the storage unit, based on an option selected by the user from the one or more options.

In at least one embodiment, the present disclosure discloses a non-transitory computer readable medium including instructions stored thereon that when processed by at least one processor cause a system to perform operations (a method) comprising receiving a document and a request for scanning the document, using the MFP. Further, one or more options for storing the document are determined. The one or more options are determined based on one or more properties for scanning the document and a current capacity of a storage unit associated with the MFP. Each of the one or more options indicates an image file format for the document and optionally at least one of a color mode and an image resolution for the document. Furthermore, the one or more options for receiving a selection from a user are provided. Thereafter, the scanned version of the document is stored in the storage unit, based on an option selected by the user from the one or more options.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristics of the disclosure are set forth in the appended claims. The disclosure itself, however, as well as a preferred mode of use, further objectives, and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

It should be appreciated by those skilled in the art that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a method and a system for managing storage of a scanned document in an MFP. Firstly, a user provides a document and a request for scanning the document, using the MFP. The request may comprise properties for scanning the document. The system determines that sufficient capacity is not available to store the document with the properties. The system determines options for storing the document within the capacity of a storage unit associated with the MFP. The options are determined based on the properties and a current capacity of the storage unit. The options indicate an image file format, a color mode, an image resolution for the document, and the like. The options are provided to the user. The user selects an option from the options provided by the system. The system stores the scanned version of the document in the storage unit, based on the option selected by the user. The present disclosure determines various options to store the document within the current capacity of the storage unit. Further, the document is stored upon receiving a consent/selection from the user. Hence, the system ensures that the scanning is performed even when the sufficient capacity is not available to store the document.

Figure 2:
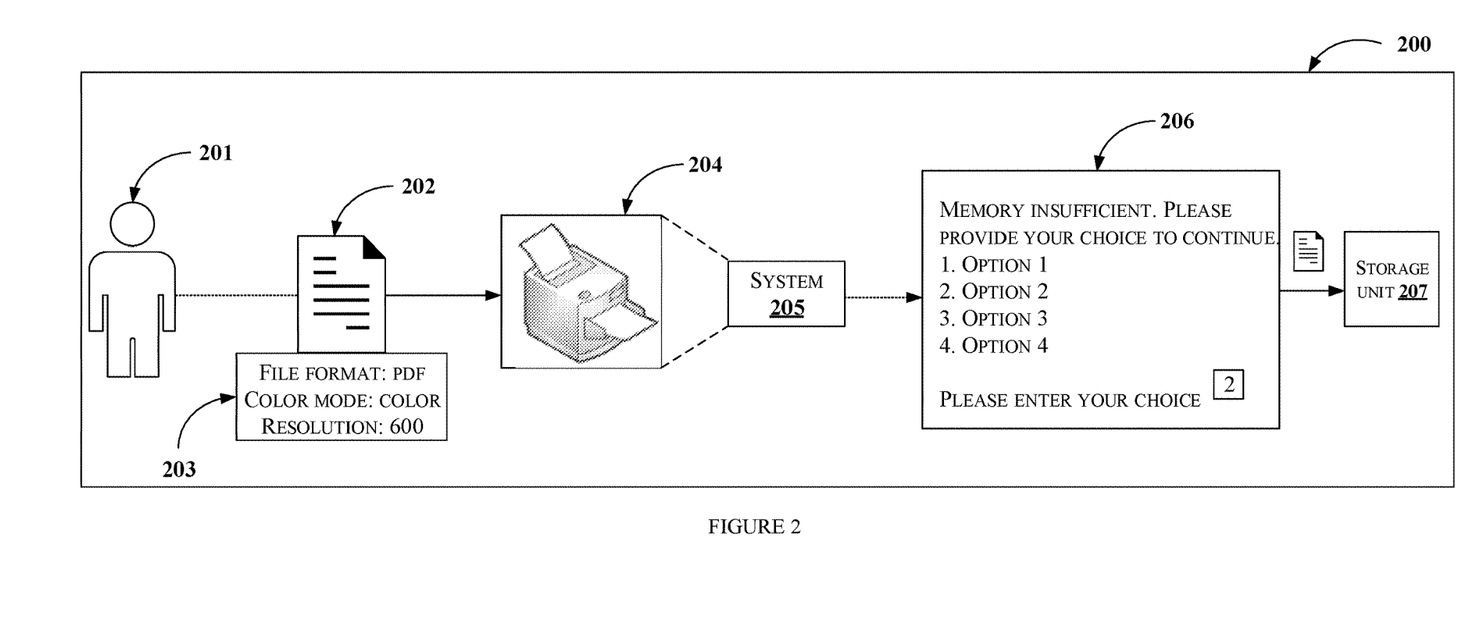
FIG. 2 shows an exemplary environment for managing storage of a scanned document in an MFP, in accordance with some embodiments of the present disclosure.

FIG. 2 illustrates an exemplary environment 200 for managing storage of a scanned document in an MFP, in accordance with some embodiments of the present disclosure. The exemplary environment 200 comprises a user 201, a document 202, an MFP 204, a system 205, a display 206, and a storage unit 207. The user 201 may wish to scan the document 202. The document 202 is a hard copy. For example, the document 202 may be a passport, a driver's license, identification card, birth certificate, and the like. The user 201 may provide a request 203 to the MFP 204 to scan the document 202. The request 203 may include one or more properties for scanning the document 202. The one or more properties may comprise an image file format, a color mode, and an image resolution preferred by the user 201 for scanning the document 202. The image file format may be PDF format, Joint Photographic Experts Group (JPEG) format, Tagged Image File Format (TIFF) format, and the like. A person skilled in the art will appreciate that the image file format may include any other known image file formats. The color mode may comprise monochrome, color, and the like. A person skilled in the art will appreciate that the color mode may include any other known color modes. The image resolution may be a value in 'dpi' for a scanned document. For example, the user 201 may select the one or more properties with the image file format as the PDF format, the color mode as color and the image resolution as 600 dpi. In an embodiment, the user 201 may provide the one or more properties via a user interface associated with the MFP 204. In another embodiment, the one or more properties are preset in the MFP 204.

The system 205 may be configured to manage storage of the scanned document in the MFP 204. The user 201 may place the document 202 on a flatbed scanner associated with the MFP 204, for scanning the document 202. Further, the user 201 may provide the request 203 for scanning the document 202, via the user interface associated with the MFP 204. The system 205 may be configured to receive the document 202 and the request 203 for scanning the document 202, using the MFP 204. Further, the MFP 204 may be configured to determine one or more options for storing the document 202. The one or more options may be determined when there is no sufficient capacity to store the document 202 in the storage unit 207 associated with the MFP 204. The one or more options may be determined based on the one or more properties for scanning the document 202 and a current capacity of the storage unit 207. The current capacity of the storage unit 207 may be an amount of data the storage unit 207 can store at a current instant of time. Each of the one or more options indicates an image file format for the document 202 and optionally at least one of, the color mode and the image resolution for the document 202. For example, the user 201 may select the one or more properties with the image file format as the PDF format, the color mode as color, and the image resolution as 600 dpi. The current capacity of the storage unit 207 may be 100 Kilo Byte (KB). The capacity required to store the document 202 with said one or more properties in the storage unit 207 may be 150 KB. The system 205 may determine a first option as the PDF format, 200 dpi and color. The system 205 may determine a second option as the JPEG format, 600 dpi and color. Similarly, the system 205 may determine other options. Further, the system 205 may be configured to provide the one or more options for receiving a selection from the user 201. FIG. 2 shows the display 206 associated with the MFP 204. Four options i.e., option 1, option 2, option 3, and option 4 are displayed on the display 206. The user 201 may select the option 2. The system 205 may be configured to store the scanned version of the document 202 in the storage unit 207, based on the option selected by the user 201 from the one or more options. In the above example, the system 205 may store the scanned version of the document 202 in the JPEG format, colored version, and with 600 dpi.

In at least one embodiment, the system 205 for managing the storage of the scanned document in the MFP 204, may be implemented in a variety of computing systems, such as a laptop computer, a desktop computer, a Personal Computer (PC), a notebook, a smartphone, a tablet, e-book readers, a server, a network server, a cloud-based server and the like. In an embodiment, the system 205 may be integrated with the MFP 204. In at least one embodiment, the system 205 may reside in the MFP 204. The system 205 may connect to the MFP 204 using a wired connection. In another embodiment, the system 205 may communicate with the MFP 204 over a communication network (not shown in FIG. 2). The communication network may include, without limitation, a direct interconnection, local area network (LAN), wide area network (WAN), wireless network (e.g., using Wireless Application Protocol), the Internet, etc.

Figure 3:
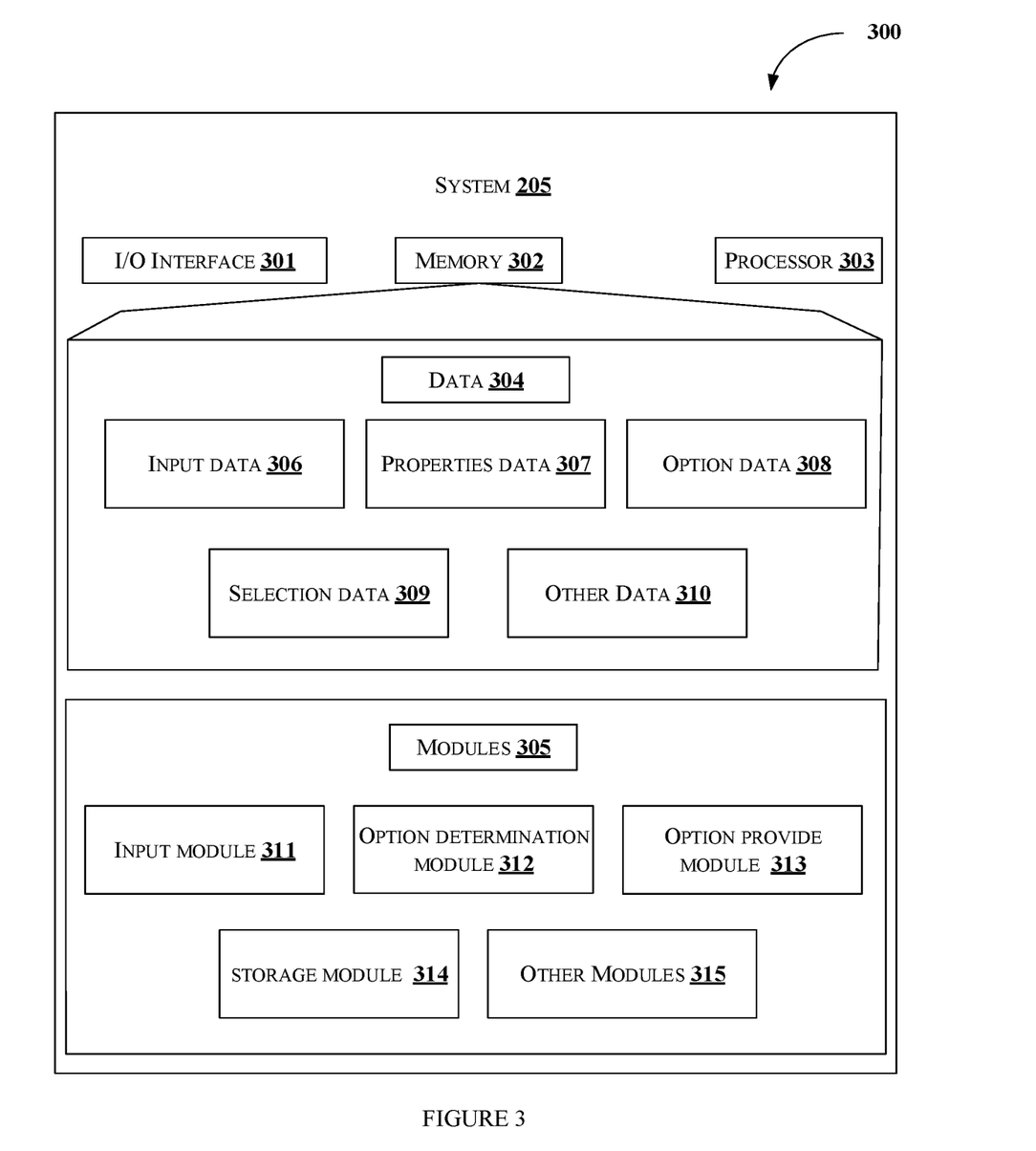
FIG. 3 illustrates an internal architecture of a system for managing storage of a scanned document in an MFP, in accordance with some embodiments of the present disclosure.

FIG. 3 illustrates an internal architecture 300 of the system 205 for managing the storage of the scanned document in the MFP 204, in accordance with some embodiments of the present disclosure. The system 205 may include Central Processing Units 303 (also referred as "CPUs" or "one or more processors 303"), Input/Output (I/O) interface 301, and a memory 302. In some embodiments, the memory 302 may be communicatively coupled to the processor 303. The memory 302 stores instructions executable by the one or more processors 303. The one or more processors 303 may comprise at least one data processor for executing program components for executing user or system-generated requests. The memory 302 may be communicatively coupled to the one or more processors 303. The memory 302 stores instructions, executable by the one or more processors 303, which, on execution, may cause the one or more processors 303 to manage the storage of the scanned document in the MFP 204. In at least one embodiment, the memory 302 may include one or more modules 305 and data 304. The one or more modules 305 may be configured to perform the steps of the present disclosure using the data 304, to manage the storage of the scanned document in the MFP 204. In at least one embodiment, each of the one or more modules 305 may be a hardware unit which may be outside the memory 302 and coupled with the system 205. As used herein, the term modules 305 refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide described functionality. The one or more modules 305 when configured with the described functionality defined in the present disclosure will result in a novel hardware. Further, the I/O interface 301 is coupled with the one or more processors 303 through which an input signal or/and an output signal is communicated. For example, the system 205 may receive the document 202, the request 203 for scanning the document 202, and selection of the option from the user 201, via the I/O interface 301.

In one implementation, the modules 305 may include, for example, an input module 311, an option determination module 312, an option provide module 313, a storage module 314, and other modules 315. It will be appreciated that such aforementioned modules 305 may be represented as a single module or a combination of different modules. In one implementation, the data 304 may include, for example, input data 306, properties data 307, option data 308, selection data 309, and other data 310.

In at least one embodiment, the input module 311 may be configured to receive the document 202 related to the user 201, using the MFP 204. Further, the input module 311 may be configured to receive the request 203 for scanning the document 202, using the MFP 204. In an embodiment, receiving the request 203 for scanning the document 202 may comprise receiving the one or more properties for scanning the document 202, from the user 201. The one or more properties received from the user 201 may comprise an image file format, a color mode, an image resolution, and the like preferred by the user 201 for scanning the document 202. The image file format is a format of storing the scanned version of the document 202 in the storage unit 207. For example, the image file format may be the PDF format, the JPEG format, the TIFF format, and the like. The color mode may be color, monochrome, and the like. The monochrome may further comprise grayscale, black-and-white, and the like. The one or more properties may comprise other properties such as image quality. For example, the user 201 may adjust brightness for scanning the document 202. In another embodiment, the one or more properties are preset in the MFP 204. For example, the MFP 204 may be configured with default properties. For example, a default image file format may be a PDF format. A default image resolution may be 600 dpi to ensure good image quality. A default color mode may be color. When the user 201 provides the document 202 without providing the one or more properties, the MFP 204 may scan the document 202 with the default properties. In another example, the preset properties may comprise the one or more properties provided by each user from multiple using the MFP 204. Each user from the multiple users may provide the one or more properties as preset properties during previous scan of corresponding users. The MFP 204 may save the preset properties of the multiple users. Further, the MFP 204 may provide the one or more properties to the system 205 when performing steps for managing the storage of the scanned document. In preferred embodiments, the request 203 may comprise number of pages of the document 202 provided by the user 201. The document 202 and the number of pages of the document 202 may be stored as the input data 306 in the memory 302. Further, the one or more properties for scanning the document 202 may be stored as the properties data 307 in the memory 302.

In at least one embodiment, the option determination module 312 may be configured to receive the input data 306 and the properties data 307 from the input module 311. The option determination module 312 may be configured to determine the current capacity of the storage unit 207 to be lesser than a capacity required to store the scanned version of the document 202 with the one or more properties. The option determination module 312 may determine the one or more options when the current capacity of the storage unit 207 is determined to be lesser than the capacity required to store the scanned version of the document 202. The option determination module 312 may determine the one or more options based on the one or more properties for scanning the document 202 and the current capacity of the storage unit 207 associated with the MFP 204. For example, the storage unit 207 may be a hard drive associated with the MFP 204. Each of the one or more options indicates the image file format for the document 202 and optionally at least one of, the color mode and the image resolution for the document 202. In an example, the option determination module 312 may determine the one or more options by changing one property of the one or more properties and retaining other two properties. For example, the one or more properties may comprise the PDF format, 600 dpi, and color. The capacity required to store the document 202 with the one or more properties may be 200 KB. The current capacity of the storage unit 207 may be 160 KB. The option determination module 312 may determine a first option as the PDF format, 600 dpi, and monochrome. The option determination module 312 may determine to change the color mode from color to monochrome, since the capacity required to store a monochrome document is less than the capacity required to store a color document. The option determination module 312 may determine a second option as the PDF format, 300 dpi, and monochrome. The option determination module 312 may determine to change the image resolution to 300 dpi, since the capacity required to store the scanned document with lesser resolution is less than the capacity required to store the scanned document with a higher resolution. Further, the option determination module 312 may determine a third option as the JPEG format, 600 dpi, and color. In another example, the option determination module 312 may determine the one or more options by changing multiple properties to store the scanned document within the current capacity. In at least one embodiment, the option determination module 312 may determine the one or more options based on one or more rules. For example, the one or more rules may comprise a pre-defined priority set in the MFP 204, user-defined priority, and the like. The pre-defined priority set may be preset in the MFP 204 based on common preferences of users of the MFP 204. For example, providing an option by changing the image resolution may be a first pre-defined priority, changing the image file format may be a second pre-defined priority, and changing the color mode may be a third pre-defined priority. The user-defined priority may be provided by the user 201 during previous scanning performed for the user 201. For example, the user 201 may prefer to scan the document 202 with a changed image file format as a first priority, the color mode as a second priority, and the image resolution as a third priority. A person skilled in the art will appreciate that any methods other than the above-mentioned methods may be used to determine the one or more options based on the one or more properties and the current capacity of the storage unit 207. The one or more options may be stored as the option data 308 in the memory 302.

In at least one embodiment, the option provide module 313 may be configured to receive the option data 308 from the option determination module 312. The option provide module 313 may be configured to provide the one or more options to the user 201. The option provide module 313 may display the one or more options on the display 206 associated with the MFP 204. Further, the option provide module 313 may be configured to receive a selection from the user 201. In an example, the one or more options displayed to the user 201 are numbered. The user 201 selects an option from the one or more options by selecting a number using a keypad associated with the MFP 204. In another example, the user 201 selects an option from the one or more options using touchscreen of the display 206 associated with the MFP 204. A person skilled in the art will appreciate that any other methods to prompt the user 201 to select an option from the one or more options may be used.

In at least one embodiment, the option provide module 313 is configured to provide a delete option for deleting one or more previously scanned documents of the user 201. The one or more previously scanned documents of the user 201 may be residing in the storage unit 207. In an embodiment, the option provide module 313 may provide the delete option when there are no options to store the scanned document within the current capacity. In another embodiment, the option provide module 313 may provide the delete option based on a preference of the user 201. The user 201 may prefer to delete the one or more previously scanned documents of the user 201 which may not be required over scanning the document 202 with the one or more options. The option provide module 313 may display the one or more previously scanned documents of the user 201 and the delete option. In at least one embodiment, the MFP 204 may be used by multiple users. Scanned documents of the multiple users may be stored in the storage unit 207. The one or more previously scanned documents of each user may be associated with a file attribute specific to the user from the multiple users. The option provide module 313 may retrieve the previously scanned documents of the user 201 from the storage unit 207 based on the file attribute. The option provide module 313 may receive selection of the delete option for deleting a document from the one or more previously scanned documents, from the user 201. The option provide module 313 may provide the delete option until the current capacity is determined to be at least greater than and equal to a capacity required to store the scanned version of the document 202. For example, the capacity required to store the document 202 may be 200 KB. The current capacity of the storage unit 207 may be 100 KB. The user 201 may delete three previously scanned documents of the user 201. The current capacity of the storage unit 207 may be 150 KB. The option provide module 313 may provide the delete option again. The user 201 may delete two previously scanned documents. The current capacity of the storage unit 207 may be 210 KB. The option provide module 313 may indicate the user 201 that further deletion of the previously scanned documents is not required, since the current capacity of the storage unit 207 is greater than the capacity required to store the document 202. In at least one embodiment, the option provide module 313 may provide an automatic option where the system 205 automatically selects an option from the one or more options. For example, the system 205 may select a best possible option or an option with highest priority based on the one or more rules. The option selected by the user 201 may be stored as the selection data 309 in the memory 302.

In at least one embodiment, the storage module 314 may be configured to receive the selection data 309 from the option provide module 313. Further, the storage module 314 may configured to receive the scanned version of the document 202, scanned based on the option selected by the user 201, from the MFP 204. The storage module 314 may store the scanned version of the document 202 in the storage unit 207 associated with the MFP 204. For example, the storage module 314 may store the scanned version of the document in a local storage associated with the MFP 204.

The other data 310 may store data, including temporary data and temporary files, generated by the one or more modules 305 for performing the various functions of the system 205. The one or more modules 305 may also include the other modules 315 to perform various miscellaneous functionalities of the system 205. The other data 310 may be stored in the memory 302. It will be appreciated that the one or more modules 305 may be represented as a single module or a combination of different modules.

In at least one embodiment, the other modules 315 may comprise a page determination module. The page determination module may be configured to receive the input data 306 from the input module 311. The input data 306 comprises the number of pages of the document 202. The page determination module may perform the steps upon receiving the request 203 from the user 201 and before scanning of the document. The page determination module may be configured to determine a maximum number of pages that can be scanned based on the one or more properties and the current capacity of the storage unit 207. The page determination module may determine a capacity required to store one page with the one or more properties. Further, the page determination module may determine the maximum number of pages from the determined capacity and the current capacity of the storage unit 207. For example, the capacity required to store one page with the image file format as the JPEG format, the image resolution as 300 dpi and the color mode as color may be 100 KB. The current capacity of the storage unit 207 may be 1000 KB. The page determination module may determine the maximum number of pages as 10. A person skilled in the art will appreciate that any other known techniques may be used to determine the maximum number of pages based on the one or more properties and the current capacity of the storage unit 207. The page determination module may determine whether the number of pages of the document 202 is lesser than the maximum number of pages. The page determination module may indicate the MFP 204 to perform the scanning of the document 202, when the number of pages of the document 202 is determined to be lesser than the maximum number of pages. Further, the page determination module may be configured to provide the one or more options for storing the document 202 when the number of pages of the document 202 is determined to be greater than the maximum number of pages. The page determination module is configured to provide pages data indicating the maximum number of pages to the user 201. Further, the page determination module may provide a first choice to the user 201 to allow providing the one or more options before scanning the document 202. Further, the page determination module may provide a second choice to the user 201 to allow providing the one or more options after scanning the document 202. The page determination module may communicate with the option provide module 313 to provide the one or more options based on selection of the first choice or the second choice by the user 201. Such embodiments are useful to consider the choice of the user 201 in providing the one or more options.

Figure 4:
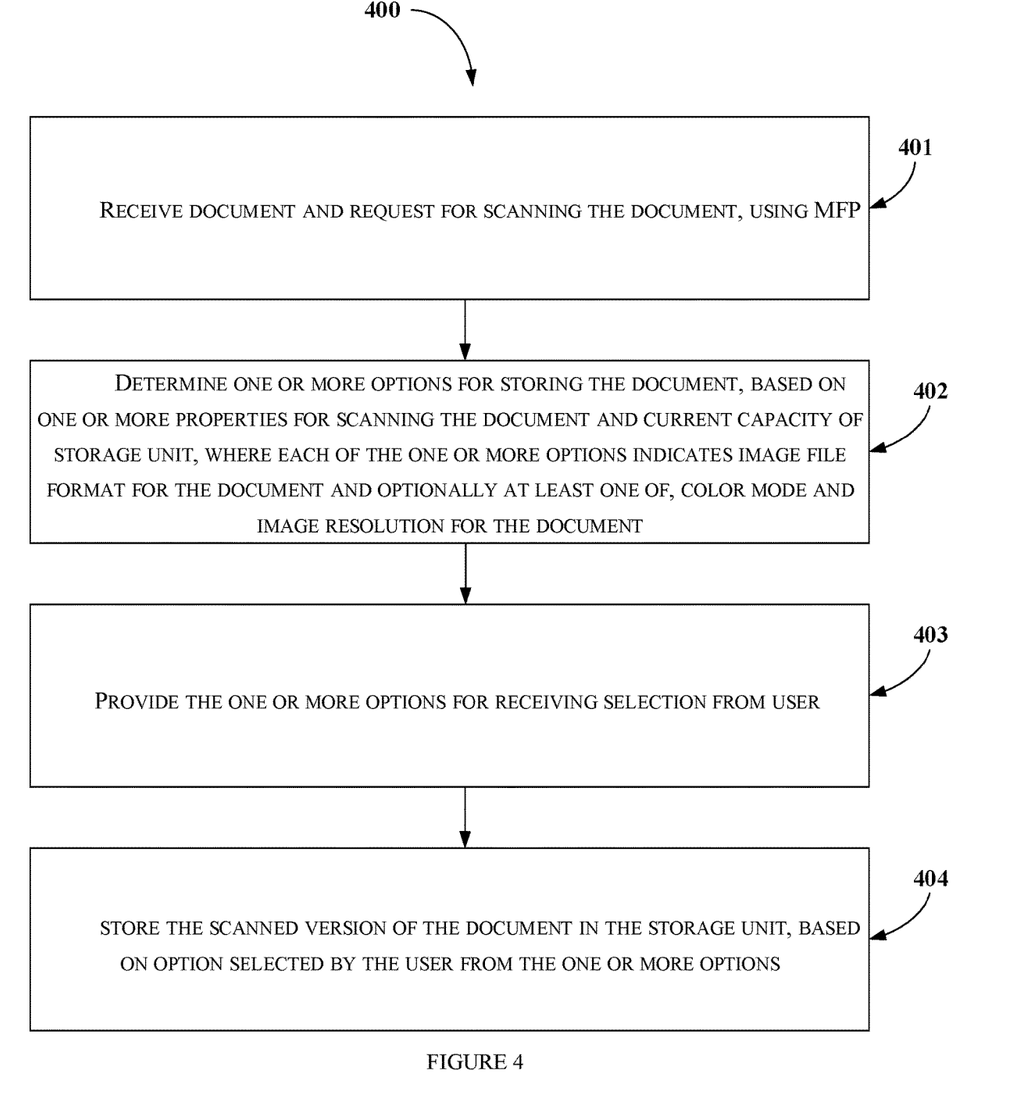
FIG. 4 shows an exemplary flow chart illustrating method steps for managing storage of a scanned document in an MFP, in accordance with some embodiments of the present disclosure.

FIG. 4 shows an exemplary flow chart illustrating method steps for managing the storage of the scanned document in the MFP 204, in accordance with some embodiments of the present disclosure. As illustrated in FIG. 4, the method 400 may comprise one or more steps. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Figure 5A:
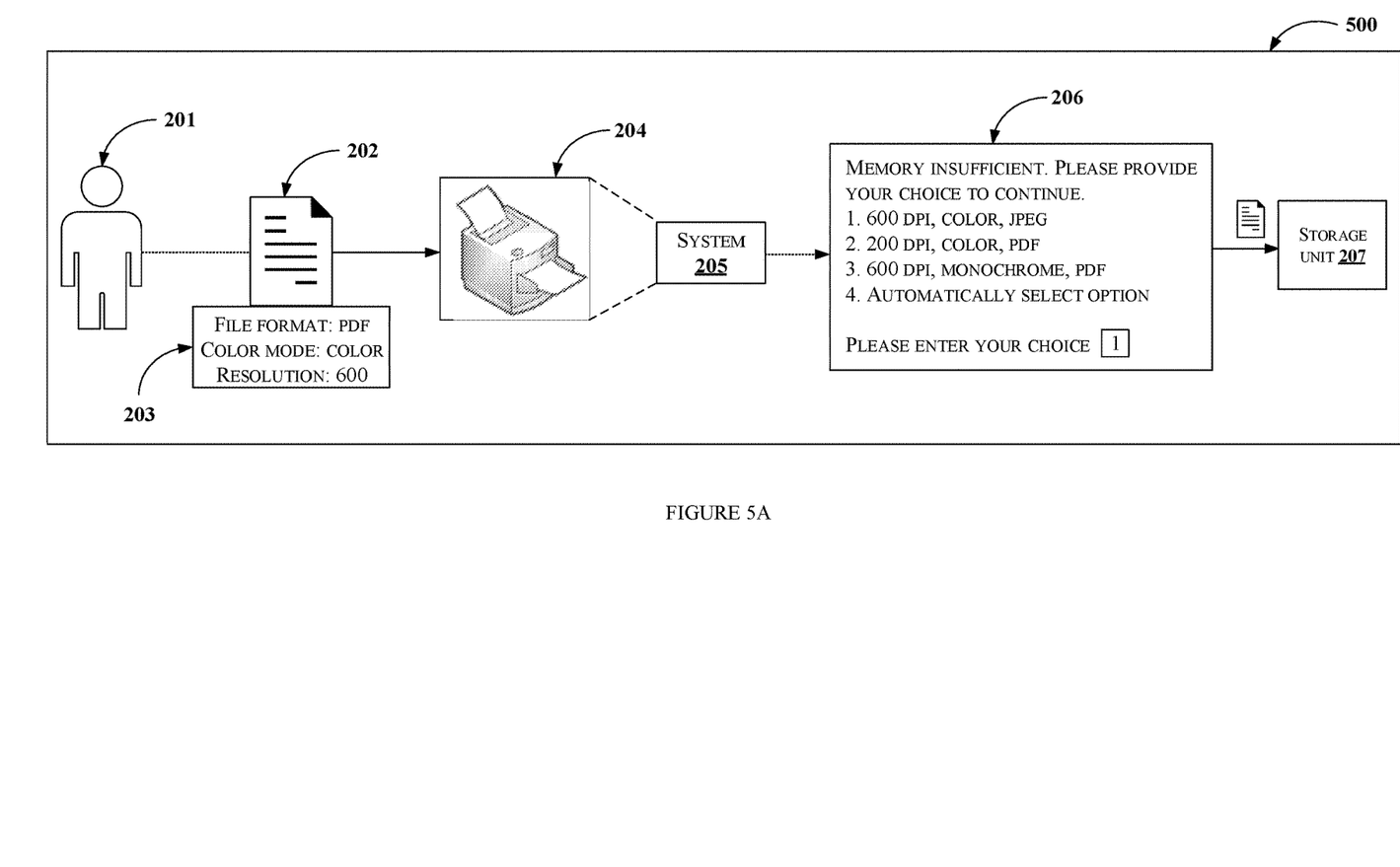
FIGS. 5A-5C show exemplary illustrations for managing storage of a scanned document in an MFP, in accordance with some embodiments of the present disclosure.

At step 401, the system 205 may receive the document 202 and the request 203 for scanning the document 202, using the MFP 204. In at least one embodiment, receiving the request 203 for scanning the document 202 may comprise receiving the one or more properties for scanning the document, from the user 201. In other embodiments, the one or more properties are preset in the MFP 204. Referring to first example 500 of FIG. 5A, the user 201 may provide the document 202 to the MFP 204 for scanning. Further, the user 201 may provide the one or more properties. Consider the one or more properties may be the PDF format, color, and 600 dpi. The system 205 may receive the document 202 and the one or more properties using the MFP 204.

Referring back to FIG. 4, at step 402, the system 205 may determine the current capacity of the storage unit 207 to be lesser than the capacity required to store the scanned version of the document 202 with the one or more properties. Further, the system 205 may determine the one or more options. The system 205 may determine the one or more options based on the one or more properties for scanning the document 202 and the current capacity of the storage unit 207 associated with the MFP 204. Referring to the first example 500 of FIG. 5A, the system 205 may determine a first option as the JPEG format, 600 dpi, and color. The system 205 may determine a second option as the PDF format, 200 dpi, and color. Further, the system 205 may determine a third option as the PDF format, 600 dpi, and monochrome.

Referring back to FIG. 4, at step 403, the system 205 may be configured to provide the one or more options to the user 201. The system 205 may display the one or more options on the display 206 associated with the MFP 204. Further, the system 205 may be configured to receive a selection of an option from the one or more options, from the user 201. Referring again to the first example 500 of FIG. 5A, the system 205 may display the one or more options to the user 201. The system 205 may prompt the user 201 to select an option from the one or more options. For example, the system 205 displays "please enter your choice". The user 201 may enter option 1 by clicking "1" on the keypad (not shown in Figures). In another example, the user 201 may enter the option 1 by using a virtual keypad on the display 206. In at least one embodiment, the system 205 may comprise other options (not illustrated in Figures). For example, the system 205 may display "exit" option. The user 201 may select the "exit" option based on his/her preference. For example, the user 201 may select the "exit" option when the user 201 does not prefer to scan the document 202 based on the one or more options.

Referring back to FIG. 4, at step 404, the system 205 may be configured to receive the scanned version of the document 202, scanned based on the option selected by the user 201. The system 205 may store the scanned version of the document 202 in the storage unit 207 associated with the MFP 204, based on the option selected by the user 201.

Figure 5B:
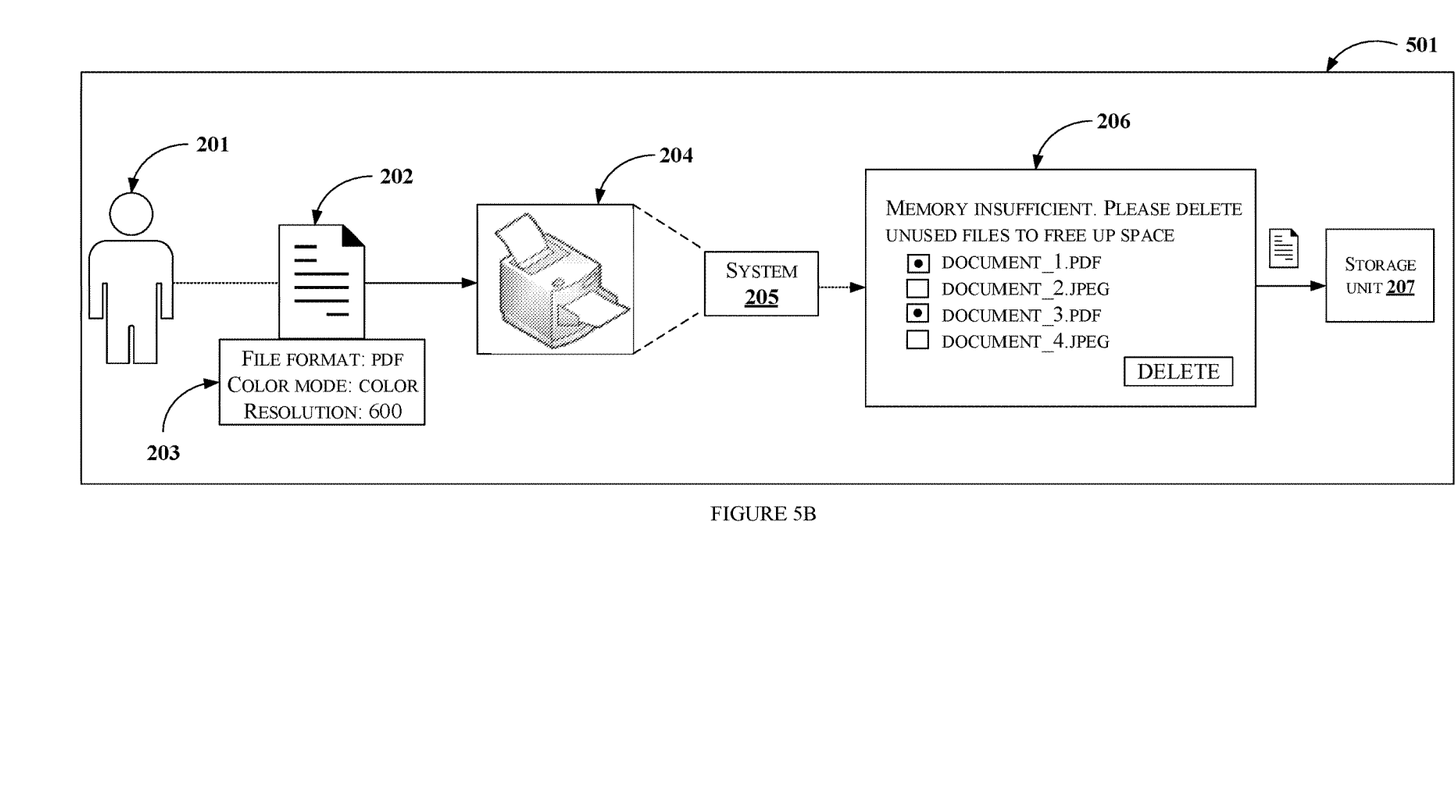

Reference is now made to second example 501 of FIG. 5B. The system 205 provides a delete option for deleting the one or more previously scanned documents of the user 201. The user 201 may be an authenticated user to use the MFP 204. The system 205 may display file names of the one or more previously scanned documents. In another example, the system 205 may display thumbnail images of the one or more previously scanned documents. The user 201 may select the one or more previously scanned documents of the user 201 and select "DELETE" option.

Figure 5C:
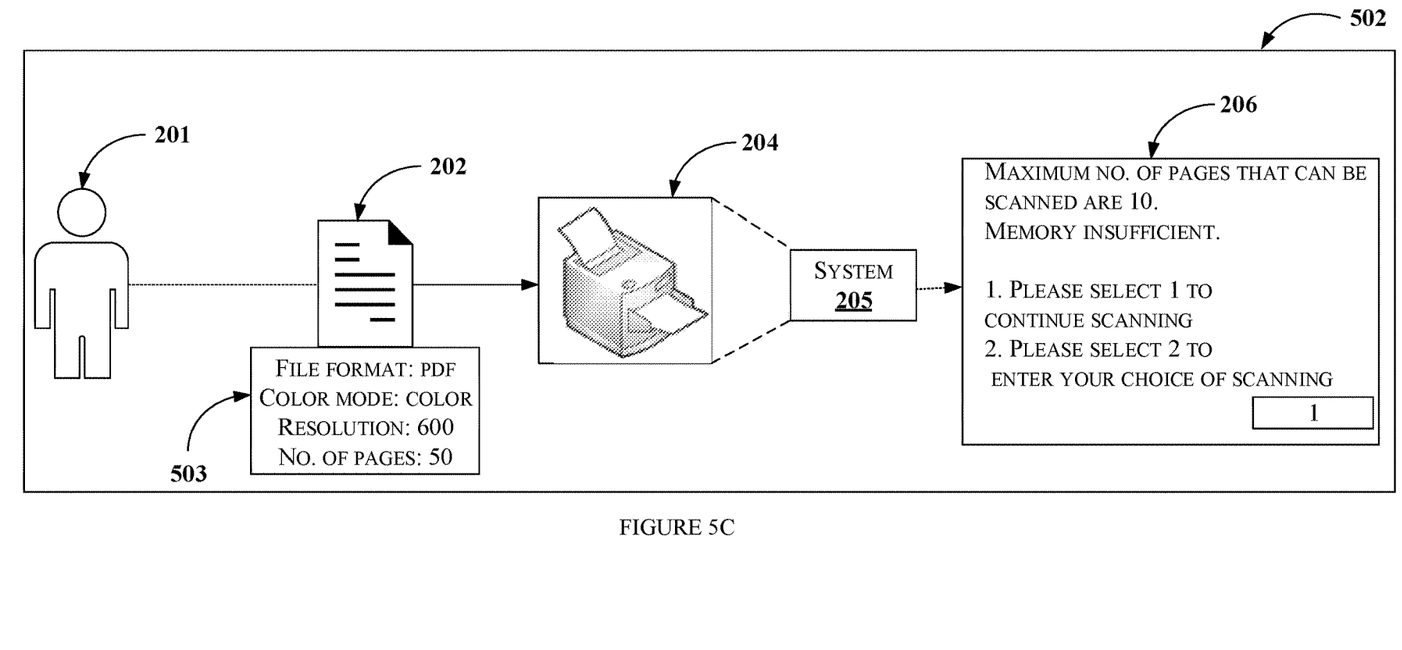

Reference is now made to third example 502 of FIG. 5C. The user 201 may provide the document 202 and a request 503 for scanning the document 202. The request 503 may comprise the one or more properties and the number of pages of the document 202. For example, the number of pages may be 50. The system 205 may receive the document 202 and the request 503. The system 205 may determine the maximum number of pages that can be scanned based on the one or more properties and the current capacity of the storage unit 207. The system 205 may display the pages data on the display 206. The system 205 may provide a first choice to the user 201 to continue scanning. When the user 201 selects the first choice, the one or more options may be provided after scanning the document 202. The system 205 may provide a second choice to the user 201 to enter choice of scanning before scanning the document 202. The user 201 may select the first choice or the second choice based on his/her preference.

Computer System

Figure 6:
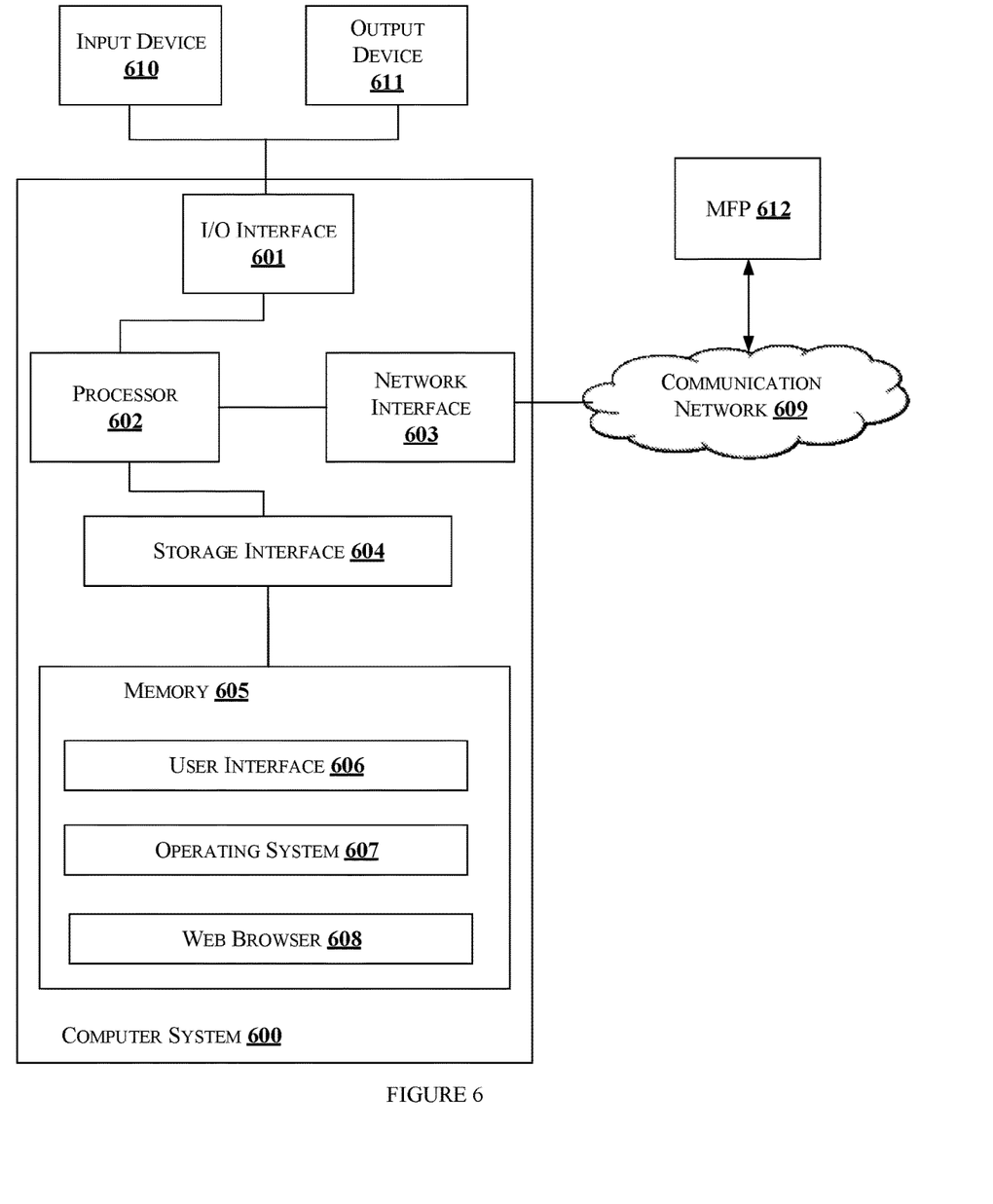
FIG. 6 shows a block diagram of a general-purpose computing system for managing storage of a scanned document in an MFP, in accordance with some embodiments of the present disclosure.

FIG. 6 illustrates a block diagram of an exemplary computer system 600 for implementing embodiments consistent with the present disclosure. In at least one embodiment, the computer system 600 may be used to implement the system 205. Thus, the computer system 600 may be used to manage storage of a scanned document in an MFP 612. In at least one embodiment, the computer system 600 may communicate with the MFP 612 over the communication network 609. The computer system 600 may comprise a Central Processing Unit 602 (also referred as "CPU" or "processor"). The processor 602 may comprise at least one data processor. The processor 602 may include specialized processing units such as integrated system (bus) controllers, memory management control units, floating point units, graphics processing units, digital signal processing units, etc.

The processor 602 may be disposed in communication with one or more input/output (I/O) devices (not shown) via I/O interface 601. The I/O interface 601 may employ communication protocols/methods such as, without limitation, audio, analog, digital, monoaural, RCA, stereo, IEEE (Institute of Electrical and Electronics Engineers)-1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices. For example, the input device 610 may include an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 611 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The computer system 600 may be connected to the MFP 612 through a communication network 609. The processor 602 may be disposed in communication with the communication network 609 via a network interface 603. The network interface 603 may communicate with the communication network 609. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 609 may include, without limitation, a direct interconnection, local area network (LAN), wide area network (WAN), wireless network (e.g., using Wireless Application Protocol), the Internet, etc. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 609 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607, web browser 608 etc. In some embodiments, computer system 600 may store user/application data, such as, the data, variables, records, etc., as described in this disclosure. Such databases may be implemented as fault-tolerant, relational, scalable, secure databases such as Oracle® or Sybase®.

The operating system 607 may facilitate resource management and operation of the computer system 600. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 600 may implement the web browser 608 stored program component. The web browser 608 may be a hypertext viewing application, for example MICROSOFT® INTERNET EXPLORER™, GOOGLE® CHROME™, MOZILLA®

FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX™, DHTML™, ADOBE® FLASH™, JAVASCRIPT™, JAVA™, Application Programming Interfaces (APIs), etc. In some embodiments, the computer system 600 may implement a mail server (not shown in Figure) stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 600 may implement a mail client stored program component. The mail client (not shown in Figure) may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, Compact Disc Read-Only Memory (CD ROMs), Digital Video Disc (DVDs), flash drives, disks, and any other known physical storage media.

Embodiments of the present disclosure ensure that the scanning is performed even when the sufficient capacity is not available to store the document. Further, the present disclosure provides the authenticated user to delete his/her previously scanned document in memory if not required. Further, the present disclosure provides the automatic option where the system selects a best possible option. Hence, user convenience is increased.

The terms "an embodiment", "embodiment", "embodiments", "the embodiment", "the embodiments", "at least one embodiment, "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method for managing storage of a scanned document in a Multi-Function Printer (MFP), the method comprising:
receiving, by a system associated with an MFP, a document and a request for scanning the document, using the MFP;
determining, by the system, one or more options for storing the document, based on one or more properties for scanning the document and based on a current capacity of a storage unit associated with the MFP, wherein each of the one or more options indicates an image file format for the document and at least one of a color mode or an image resolution for the document;
providing, by the system, the one or more options for receiving a selection from a user; and
storing, by the system, the scanned version of the document in the storage unit, based on an option selected by the user from the one or more options.

2. The method of claim 1, wherein the image file format is a format of storing the scanned version of the document in the storage unit.

3. The method of claim 1, wherein the request for scanning the document further comprises a number of pages of the document provided by the user.

4. The method of claim 1, further comprising:
providing a delete option for deleting one or more previously scanned documents of the user, residing in the storage unit, until the current capacity is determined to be at least greater than or equal to a capacity required to store the scanned version of the document, upon receiving selection of the delete option for deleting each of one or more documents from the one or more previously scanned documents, from the user; and
storing the scanned version of the document upon determining the current capacity to be at least greater than or equal to the capacity required to store the scanned version of the document.

5. The method of claim 1, wherein the one or more properties are at least one of, received from the user and preset in the MFP (204).

6. The method of claim 5, wherein the one or more properties received from the user comprises at least one of an image file format, a color mode, or an image resolution preferred by the user for scanning the document.

7. The method of claim 1, wherein determining the one or more options comprises:
determining the current capacity of the storage unit to be less than a capacity required to store the scanned version of the document with the one or more properties provided by the user; and
determining the one or more options for storing the scanned version of the document within the current capacity.

8. The method of claim 1, wherein the one or more options further comprises an automatic option where the system automatically selects an option from the one or more options.

9. The method of claim 1, further comprising, upon receiving the request from the user, and before scanning of the document:
determining a maximum number of pages that can be scanned based on the one or more properties and the current capacity; and
providing pages data indicating the maximum number of pages.

10. The method of claim 9, further comprising:
performing scanning of the document, when a number of pages of the document is determined to be less than the maximum number of pages.

11. The method of claim 9, further comprising:
providing one or more options for storing the document when a number of pages of the document is determined to be greater than the maximum number of pages.

12. A system for managing storage of a scanned document in a Multi-Function Printer (MFP), the system comprising:
one or more processors; and
a memory, wherein the memory stores processor-executable instructions, which, on execution, cause the one or more processors to:
receive a document and a request for scanning the document, using an MFP;
determine one or more options for storing the document, based on one or more properties for scanning the document and based on a current capacity of a storage unit associated with the MFP, wherein each of the one or more options indicates an image file format for the document and at least one of a color mode or an image resolution for the document;
provide the one or more options for receiving a selection from a user; and
store the scanned version of the document in the storage unit, based on an option selected by the user from the one or more options.

13. The system of claim 12, wherein the request for scanning the document further comprises a number of pages of the document provided by the user.

14. The system of claim 12, wherein the image file format is a format of storing the scanned version of the document in the storage unit.

15. The system of claim 12, wherein the one or more processors are further configured to:
provide a delete option for deleting one or more previously scanned documents of the user, residing in the storage unit, until the current capacity is determined to be at least greater than or equal to a capacity required to store the scanned version of the document, upon receiving selection of the delete option for deleting each of one or more documents from the one or more previously scanned documents, from the user; and
store the scanned version of the document upon determining the current capacity to be at least greater than or equal to the capacity required to store the scanned version of the document.

16. The system of claim 12, wherein the one or more properties are one of, received from the user or preset in the MFP.

17. The system of claim 16, wherein the one or more properties received from the user comprises at least one of an image file format, a color mode, or an image resolution preferred by the user for scanning the document.

18. The system of claim 12, wherein the one or more processors are configured to determine the one or more options by:
determining the current capacity of the storage unit to be less than a capacity required to store the scanned version of the document with the one or more properties provided by the user; and
determining the one or more options for storing the scanned version of the document within the current capacity.

19. The system of claim 12, wherein the one or more options further comprises an automatic option where the system automatically selects an option from the one or more options.

20. The system of claim 12, wherein the one or more processors are further configured to, upon receiving the request from the user, and before scanning of the document:
determine a maximum number of pages that can be scanned based on the one or more properties and the current capacity; and
provide pages data indicating the maximum number of pages.

21. The system of claim 20, wherein the one or more processors are further configured to:
perform scanning of the document, when a number of pages of the document is determined to be less than the maximum number of pages.

22. The system of claim 20, wherein the one or more processors are further configured to:
provide one or more options for storing the document when a number of pages of the document is determined to be greater than the maximum number of pages.

23. A non-transitory computer readable medium including instructions stored thereon that when processed by at least one processor cause a device to perform a method comprising:

receiving a document and a request for scanning the document, using an MFP;

determining one or more options for storing the document, based on one or more properties for scanning the document and based on a current capacity of a storage unit associated with the MFP, wherein each of the one or more options indicates an image file format for the document and at least one of a color mode or an image resolution for the document;

providing the one or more options for receiving a selection from a user; and storing the scanned version of the document in the storage unit, based on an option selected by the user from the one or more options.

24. The medium of claim 23, wherein the image file format is a format of storing the scanned version of the document in the storage unit.

25. The medium of claim 23, wherein the request for scanning the document further comprises a number of pages of the document provided by the user.

26. The medium of claim 23, the method further comprising:

providing a delete option for deleting one or more previously scanned documents of the user, residing in the storage unit, until the current capacity is determined to be at least greater than or equal to a capacity required to store the scanned version of the document, upon receiving selection of the delete option for deleting each of one or more documents from the one or more previously scanned documents, from the user; and storing the scanned version of the document upon determining the current capacity to be at least greater than or equal to the capacity required to store the scanned version of the document.

27. The medium of claim 23, wherein the one or more properties are one of, received from the user or preset in the MFP.

28. The medium of claim 27, wherein the one or more properties received from the user comprises at least one of an image file format, a color mode, or an image resolution preferred by the user for scanning the document.

29. The medium of claim 23, wherein determining the one or more options comprises:

determining the current capacity of the storage unit to be less than a capacity required to store the scanned version of the document with the one or more properties provided by the user; and determining the one or more options for storing the scanned version of the document within the current capacity.

30. The medium of claim 23, wherein the one or more options further comprises an automatic option where the system automatically selects an option from the one or more options.

31. The medium of claim 23, the method further comprising, upon receiving the request from the user, and before scanning of the document:

determining a maximum number of pages that can be scanned based on the one or more properties and the current capacity; and providing pages data indicating the maximum number of pages.

32. The medium of claim 31, the method further comprising:

performing scanning of the document, when a number of pages of the document is determined to be less than the maximum number of pages.

33. The medium of claim 31, the method further comprising:

providing one or more options for storing the document when a number of pages of the document is determined to be greater than the maximum number of pages.

* * * * *